March 8, 1927.
S. POLLAK
1,620,285
FLEXIBLE COUPLING
Filed July 2, 1925
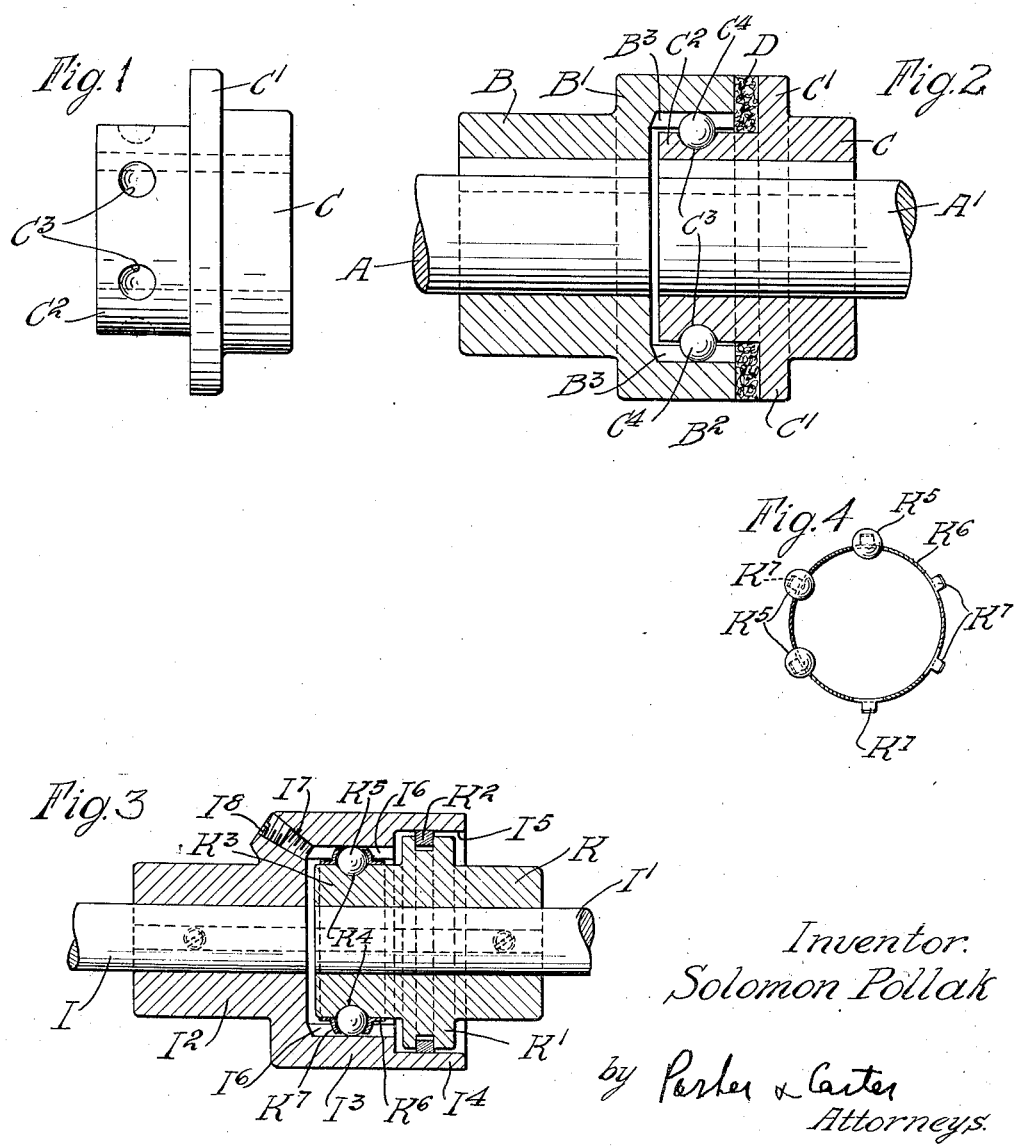
Inventor.
Solomon Pollak
by Porter & Carter
Attorneys.

Patented Mar. 8, 1927.

1,620,285

UNITED STATES PATENT OFFICE.

SOLOMON POLLAK, OF SAN FRANCISCO, CALIFORNIA, ASSIGNOR TO LINK-BELT COMPANY, OF CHICAGO, ILLINOIS, A CORPORATION OF ILLINOIS.

FLEXIBLE COUPLING.

Application filed July 2, 1925. Serial No. 41,041.

My invention relates to a flexible coupling and particularly to a type of coupling adapted for use with high speed shafts. One object is the provision of such a coupling which shall have a maximum of strength and flexibility. Another object is the provision of such a coupling which shall be simple, easy and cheap to manufacture. Another object is the provision of a coupling which shall be easy to lubricate and which shall retain the lubricant. Other objects will appear from time to time in the course of the specification and claims.

I illustrate my invention more or less diagrammatically in the accompanying drawings wherein—

Figure 1 is a front elevation of one of the members of the coupling;

Figures 2 and 3 are axial sections through variant forms; and

Figure 4 is a detail.

Like parts are indicated by like characters throughout the specification and drawings.

Referring to Figure 2 A and $A^1$ are opposed shaft ends either one of which may be a driving or a driven member.

B is a collar keyed to the shaft A and provided with an expanded portion $B^1$, having a circumferential flange $B^2$. It will be understood that the flange $B^2$ projects beyond the end of the shaft A which is herein shown as terminating flush with the inner face of the expanded portion $B^1$. The flange $B^2$ is axially slotted or channeled as at $B^3$, the channels being of generally arcuate cross section.

C is a sleeve keyed to the shaft $A^1$ and provided with a circumferential flange $C^1$ of substantially the same diameter as the flange $B^2$. The sleeve continues with an interior reduced portion $C^2$ adapted to penetrate within the flange $B^2$ and terminating flush with the end of the shaft $A^1$. The reduced portion $C^2$ is provided with a plurality of generally hemispherical apertures $C^3$ in which are seated the ball bearings $C^4$. It will be understood that the balls also seat in the channels $B^3$, there being a perceptible clearance however between the opposed surfaces of the flange $B^2$ and the reduced sleeve portion $C^2$.

D is a closing ring or packing, preferably but not necessarily fibrous, and more or less flexible or compressible. It is positioned about the reduced portion $C^2$ and is gripped between the flanges $B^2$ and $C^1$ the fit being preferably tight but not sufficiently tight to render the packing ring D incompressible or to affect the flexibility of the coupling.

Referring to Figure 3 I and $I^1$ represent the ends of the driven shafts. $I^2$ is a collar keyed or pinned to the end of the shaft I and having the enlarged and axially extending flange $I^3$ which terminates in a portion $I^4$ which is exteriorly of the same diameter as $I^3$ but is provided with an inside bearing surface $I^5$ of enlarged diameter. The flange $I^3$ is axially channeled as at $I^6$ and is provided with an oil inlet $I^7$ closed for example by the screw plug $I^8$.

K is a collar keyed or pinned to the end of the shaft $I^1$ and provided intermediate its ends with the circumferential flange $K^1$ in which is a packing or piston ring $K^2$ adapted closely to engage the cylindrical bearing surface $I^5$. The inner portion $K^3$ of the sleeve is provided with the spherical apertures $K^4$ to receive the balls $K^5$. $K^6$ is a ring surrounding said sleeve portion $K^3$ and provided with projecting members $K^7$ adapted to surround and center said balls and to hold them in position.

It will be understood that whereas I have illustrated a practical and operative device that nevertheless many changes might be made in the size, shape, number and disposition of parts without departing from the spirit of my invention. I therefore wish the drawings and description to be taken as in a broad sense diagrammatic and illustrative rather than as limiting me to the disclosure as made.

The use and operation of my invention are as follows:

I have developed an extremely simple flexible coupling. Either of the shaft ends shown may be the driving and either the driven member. The actual working connection is provided by roller bearings, held against rotary movement in relation to the sleeves. The balls are permitted axial movement in relation to one of said sleeves, along arcuately cross sectioned channels. Under some circumstances, a retainer, such as the ring $K^6$, may be employed. Under other circumstances, as in the structure of Figure 2, it may be dispensed with. I may make a closed piston connection between the opposed sleeves and provide oil ingress means. In such case I may fill the space between the sleeves with oil at relatively long intervals and practice has shown that lubricant need in such case be applied only at infrequent intervals. I may also employ a compressible packing.

The coupling may be used for extremely high speeds, since it is of itself perfectly balanced. Great power can be delivered by a comparatively small sized coupling since the entire load to be transmitted could safely be carried by one ball. In practice with even only fairly accurate machine work, at least half of the balls will transmit pressure, and the number or proportion of balls effectively contacting both sleeves will increase with the operation of the coupling. The coupling is particularly valuable with shafts which are subject to great variation in temperature and thus to variation in length, and axial shifting.

Referring to Figure 2, the form of coupling therein illustrated permits the employment of a driving and a driven shaft the ends of which are more or less inclined to each other.

I claim:

1. In a flexible coupling a pair of opposed, closely abutting shaft ends, coupling sleeves mounted on each of said shafts, one of said coupling sleeves being formed with a generally cylindrical portion adjacent the end of the shaft to which it is secured, an outwardly projecting flange about the intermediate portion of said sleeve, the cylindrical portion being penetrated by a plurality of spherically formed apertures, the other sleeve being provided with a generally cylindrical enclosing sleeve surrounding said first mentioned sleeve and provided with a plurality of axial grooves of generally arcuate cross section, and balls positioned in said cylindrical apertures and seated in said grooves, and a packing ring interpositioned between said outwardly projecting flange and the cylindrical enclosing sleeve.

2. In a flexible coupling a pair of opposed, closely abutting shaft ends, coupling sleeves mounted on each of said shafts, one of said coupling sleeves being formed with a generally cylindrical portion adjacent the end of the shaft to which it is secured, an outwardly projecting flange about the intermediate portion of said sleeve, the cylindrical portion being penetrated by a plurality of spherically formed apertures, the other sleeve being provided with a generally cylindrical enclosing sleeve surrounding said first mentioned sleeve and provided with a plurality of axial grooves of generally arcuate cross section, and balls positioned in said cylindrical apertures and seated in said grooves, and a piston ring interposed between said outwardly projecting flange and the cylindrical enclosing sleeve.

3. In a flexible coupling a pair of opposed, closely abutting shaft ends, coupling sleeves mounted on each of said shafts, one of said coupling sleeves being formed with a generally cylindrical portion adjacent the end of the shaft to which it is secured, an outwardly projecting flange about the intermediate portion of said sleeve, the cylindrical portion being penetrated by a plurality of spherically formed apertures, the other sleeve being provided with a generally cylindrical enclosing sleeve surrounding said first mentioned sleeve and provided with a plurality of axial grooves of generally arcuate cross section, and balls positioned in said cylindrical apertures and seated in said grooves, and a piston ring interposed between said outwardly projecting flange and the cylindrical enclosing sleeve, said flange being circumferentially slotted to receive it.

Signed at San Francisco city and county of San Francisco and State of California, this 26th day of June, 1925.

SOLOMON POLLAK.